US012585141B2

(12) United States Patent　　　　(10) Patent No.:　US 12,585,141 B2
Giraudet et al.　　　　　　　　　　(45) Date of Patent:　　Mar. 24, 2026

(54) OPTICAL LENS

(71) Applicant: Essilor International, Charenton-le-pont (FR)

(72) Inventors: Guillaume Giraudet, Charenton-le-pont (FR); Matthieu Guillot, Charenton-le-pont (FR); Daniel Spiegel, Singapore (SG)

(73) Assignee: Essilor International, Charenton-le-Pont (FR)

( * ) Notice: Subject to any disclaimer, the term of this patent is extended or adjusted under 35 U.S.C. 154(b) by 319 days.

(21) Appl. No.: 18/258,378

(22) PCT Filed: Dec. 15, 2021

(86) PCT No.: PCT/EP2021/085925
§ 371 (c)(1),
(2) Date: Jun. 20, 2023

(87) PCT Pub. No.: WO2022/136056
PCT Pub. Date: Jun. 30, 2022

(65) Prior Publication Data
US 2024/0302677 A1　　Sep. 12, 2024

(30) Foreign Application Priority Data
Dec. 23, 2020　　(EP) ..................................... 20306670

(51) Int. Cl.
G02C 7/02　　　　(2006.01)
G02C 7/04　　　　(2006.01)
(52) U.S. Cl.
CPC ............. G02C 7/022 (2013.01); G02C 7/027 (2013.01); G02C 7/049 (2013.01); G02C 2202/24 (2013.01)

(58) Field of Classification Search
None
See application file for complete search history.

(56) References Cited

U.S. PATENT DOCUMENTS

| | | | | |
|---|---|---|---|---|
| 10,268,050 | B2 * | 4/2019 | To | .......................... G02C 7/022 |
| 2015/0160477 | A1 * | 6/2015 | Dai | .......................... G02C 7/06 |
| | | | | 351/159.48 |

(Continued)

FOREIGN PATENT DOCUMENTS

| | | |
|---|---|---|
| CN | 103118627 A | 5/2013 |
| CN | 204143094 U | 2/2015 |

(Continued)

OTHER PUBLICATIONS

International Search Report & Written Opinion issued Mar. 28, 2022 in PCT/EP2021/085925 filed on Dec. 15, 2021, 12 pages.

(Continued)

*Primary Examiner* — Darryl J Collins
(74) *Attorney, Agent, or Firm* — Oblon, McClelland, Maier & Neustadt, L.L.P.

(57) ABSTRACT

An optical lens intended to be worn in front of an eye of a wearer having at least one prescribed refractive power Px. The optical lens includes a refraction area having a refractive power based on the prescribed refractive power Px for the eye of the wearer and including at least the central zone of the optical lens, and a plurality of optical elements having an optical function of not focusing an image on the retina of the eye of the wearer. The optical elements are arranged based at least on the prescribed refractive power Px and the shape of the retina of the wearer.

15 Claims, 4 Drawing Sheets

(56)  References Cited

U.S. PATENT DOCUMENTS

| | | | |
|---|---|---|---|
| 2020/0073147 A1 | 3/2020 | Bakaraju et al. | |
| 2023/0128895 A1* | 4/2023 | Gacoin | B29D 11/00528 |
| | | | 351/159.41 |
| 2023/0161177 A1* | 5/2023 | Varnas | B29D 11/00326 |
| | | | 351/159.42 |
| 2023/0296917 A1* | 9/2023 | Braunger | B29D 11/00326 |
| | | | 351/159.41 |

FOREIGN PATENT DOCUMENTS

| | | |
|---|---|---|
| CN | 110687689 A | 1/2020 |
| CN | 111095083 A | 5/2020 |
| CN | 210690971 U | 6/2020 |
| EP | 3 561 578 A1 | 10/2019 |

OTHER PUBLICATIONS

Combined Chinese Office Action and Search Report issued Oct. 20, 2025, in corresponding Chinese Patent Application No. 202180079583.X (English Translation only), 7 pages.

\* cited by examiner

OPTICAL LENS

TECHNICAL FIELD

The disclosure relates to an optical lens intended to be worn in front of an eye of a wearer having at least one prescribed refractive power Px and a method, for example implemented by computer means, for determining an optical lens according to the disclosure.

BACKGROUND OF THE DISCLOSURE

Myopia of an eye is characterized by the fact that the eye focuses distant objects in front of its retina. Myopia is usually corrected using a concave lens.

Myopia, also referred as to short-sightedness, has become a major public health problem worldwide. Accordingly, a large effort has been made to develop solutions aiming to slow down myopia progression.

Most of the recent management strategies for myopia progression involved acting on the peripheral vision using optical defocus. This approach has received a great deal of interest since works in chicks and primates showed that foveal refractive error could be manipulated through peripheral optical defocus without the involvement of an intact fovea. Several methods and products are used to slow down myopia progression by inducing such peripheral optical defocus. Among these solutions, orthokeratology contact lenses, soft bifocal and progressive contact lenses, circular progressive ophthalmic lenses, and lenses with array of microlenses have been shown to be more or less effective, through randomized controlled trials. Recent results suggested that microlenses in the peripheral visual field would be the most efficient solution for myopia control.

Myopia control solutions with array of microlenses have been proposed, in particular by the applicant, however, the proposed solutions are either standard or arranged based on the prescribed refractive power of the wearer.

Typically, the arrangement of the microlenses may be adapted based on the level of myopia of the wearer.

Some studies highlighted that peripheral retina shape may differ between individuals and more importantly may be asymmetric between the nasal and temporal fields. Actual myopia control solutions do not consider adapting the optical properties of the peripheral field according to individual variability in retina shape.

Therefore, there is a clear need for a myopia control solution that would be more adapted to the wearer.

SUMMARY OF THE DISCLOSURE

To this end, the disclosure proposes an optical lens intended to be worn in front of an eye of a wearer having at least one prescribed refractive power Px, the optical lens comprising:

- a refraction area having a refractive power based on the prescribed refractive power Px for said eye of the wearer and comprising at least the central zone of the optical lens,
- a plurality of optical elements having an optical function of not focusing an image on the retina of the eye of the wearer, for example so as to slow down the progression of the abnormal refraction of the eye, wherein the optical elements are arranged based at least on the prescribed refractive power Px and the shape of the retina of the wearer.

Advantageously, the arrangement of the optical elements of the optical lens of the disclosure is adapted not only to the prescribed refractive power Px of the wearer but also to the shape of the retina of the wearer.

Recent studies highlighted that peripheral retina shape may differ between individuals and more importantly may be asymmetric between the nasal and temporal fields. Prior art myopia control solutions do not adapt the optical elements to individual variability in retina shape. Furthermore, the prior art myopia control solutions are rotationally symmetrical. So they cannot integrate asymmetries between nasal and temporal fields.

A purpose of the current disclosure is to solve this problem by measuring retina shape and providing customized or segmented myopia control solutions according to the properties of the peripheral field, using various designs of microlenses pattern, power and distribution.

The benefit of the optical lens according to the disclosure is to have better control on myopia: for instance, defining optical elements designs, providing the right level of myopia reduction signal vs retina shape or providing extra level of signal when retinal shape indicates a profile of myopia high speed progression.

According to further embodiments which can be considered alone or in combination:

- the central zone is arranged based at least on the prescribed refractive power Px and the shape of the retina of the wearer; and/or
- the optical lens comprises a framing reference point that faces the pupil of the wearer gazing straight ahead in standard wearing conditions; and/or
- the central zone comprises the optical center of the lens and has a characteristic dimension greater than 4 mm and smaller than 20 mm; and/or
- the characteristic dimension of the central zone of the optical lens is related to the dimension of the spherical portion of the retina of the wearer; and/or
- the characteristic dimension of the central zone of the optical lens increases with the dimension of the spherical portion of the retina of the wearer; and/or
- the shape of the retina corresponds at least to the global shape of the retina within a reference plane, for example horizontal or vertical; and/or
- the shape of the retina of the wearer is based on a predetermined model of retina shape selected based on the prescribed refractive power Px of the wearer; and/or
- the shape of the retina of the wearer is a predetermined model of retina shape selected based on the prescribed refractive power Px of the wearer; and/or
- the optical function of each optical element and/or density of the optical elements are adapted to the degree of asymmetry shape between the nasal and temporal part of the retina of the wearer; and/or
- the optical power of each optical element and/or density of the optical elements increases with the degree of asymmetry shape between the nasal and temporal part of the retina of the wearer; and/or
- the optical function of each optical element and/or density of the optical elements are adapted to the degree of prolateness of the retina of the wearer; and/or
- the optical power of each optical element and/or density of the optical elements decreases with the degree of prolateness of the retina of the wearer; and/or
- optical function of each optical element of the optical lens is adapted so as to defocus and/or not focus in standard wearing conditions at a constant distance from the temporal to nasal part of the retina of the wearer; and/or optical function of each optical element of the optical lens is adapted so as to defocus and/or not focus in standard wearing conditions at a constant distance from the temporal to nasal part of the retina of the wearer; and/or the optical function, for example the optical power, of each optical element and/or the density distribution of the optical elements is adapted so as to defocus and/or not focus in standard wearing conditions at different distances from the temporal and nasal parts of the retina of the wearer, for example based at least on the degree of asymmetry shape between the nasal and temporal parts of the retina of the wearer; and/or the optical function, for example the optical power of each optical element and/or the density distribution of the optical elements is adapted so as to defocus and/or not focus in standard wearing conditions at different distances from the temporal and nasal parts of the retina of the wearer, for example based at least on the degree of asymmetry shape between the nasal and temporal parts of the retina of the wearer; and/or the optical lens is divided in at least three complementary zones, the central zone and two quadrants, each quadrant comprising a plurality of optical elements, the optical function of each optical element and/or the density of optical elements in each quadrant being adapted to the global shape of the retina; and/or the optical lens is divided in at least five complementary zones, the central zone and four quadrants with an angle between two quadrant greater than 200 and smaller than 90°, each quadrant comprising a plurality of optical elements, the optical function of each optical element and/or the density of optical elements in the temporal and nasal quadrants being adapted to the global shape of the retina in a horizontal plane and the optical function of each optical element and/or the density of optical elements in the upper and lower quadrants being adapted to the global shape of the retina in a vertical plane; and/or at least part of, for example all of, the optical elements are located on the front surface of the optical lens; and/or at least part of, for example all of, the optical elements are located on the back surface of the optical lens; and/or at least part of, for example all of, the optical elements are located between the front and back surfaces of the optical lens; and/or at least part, for example all, of the optical elements have an annular shape, for example around the refraction area; and/or the optical elements have a contour shape being inscribable in a circle having a diameter greater than or equal to 0.2 mm, for example greater than or equal to 0.4, for example greater than or equal to 0.6, and smaller than or equal to 2.0 mm, for example smaller than 1.0 mm; and/or the optical elements are positioned along a plurality of concentric rings; and/or the optical elements are positioned on a structured mesh; and/or the optical elements are positioned on a squared mesh or a hexagonal mesh or a triangle mesh or an octagonal mesh; and/or the mesh structure is a random mesh, for example a Voronoi mesh; and/or at least one, for example all, of the optical element has a non-spherical optical function in standard wearing conditions; and/or at least one, for example all, of the optical elements has a cylindrical power and/or at least part, for example all, of the optical elements have a constant optical power and a discontinuous first derivative between two contiguous optical elements; and/or the optical elements are configured so that along at least one section of the lens the mean sphere of optical elements varies from a point of said section towards the peripheral part of said section; and/or the optical elements are configured so that along at least one section of the lens the cylinder of optical elements varies from a point of said section towards the peripheral part of said section; and/or the optical elements are configured so that along the at least one section of the lens the mean sphere and/or the cylinder of optical elements varies from the center of said section towards the peripheral part of said section, for example increases then decreases, for example decreases, for example increases; and/or the optical lens comprises a refraction area free of optical elements and having an optical function corresponding the prescribed optical power $P_x$; and/or the refractive area is formed as the area other than the areas formed as the plurality of optical elements; and/or the refraction area comprises an optical center and the optical elements are configured so that along any section passing through the optical center of the lens the mean sphere and/or the cylinder of the optical elements varies from the optical center towards the peripheral part of the lens, for example increases then decreases, for example decreases, for example increases; and/or the refraction area comprises a far vision reference point, a near vision reference, and a meridian joining the far and near vision reference points, the optical elements are configured so that in standard wearing conditions along any horizontal section of the lens the mean sphere and/or the cylinder of the optical elements varies from the intersection of said horizontal section with the meridian towards the peripheral part of the lens, for example increases then decreases, for example decreases, for example increases; and/or the mean sphere and/or the cylinder increase function along the sections are different depending on the position of said section along the meridian; and/or the mean sphere and/or the cylinder increase function along the sections are unsymmetrical; and/or the optical elements are configured so that in standard wearing condition the at least one section is a horizontal section; and/or the mean sphere and/or the cylinder of optical elements varies, for example increases, from a first point of said section towards the peripheral part of said section and varies, for example decreases, from a second point of said section towards the peripheral part of said section, the second point being closer to the peripheral part of said section than the first point; and/or the mean sphere and/or the cylinder increase function along the at least one section is a Gaussian function; and/or the mean sphere and/or the cylinder increase function along the at least one section is a Quadratic function; and/or

the mean sphere of at least part, for example all, of the optical elements varies, for example increases or decreases, within said optical element with eccentricity; and/or the optical elements are organized in at least two groups of contiguous optical elements; and/or each group of contiguous optical element is organized in at least two concentric rings having the same center, the concentric ring of each group of contiguous optical element being defined by an inner diameter corresponding to the smallest circle that is tangent to at least one optical element of said group and an outer diameter corresponding to the largest circle that is tangent to at least one optical elements of said group;

at least part of, for example all, the concentric rings of optical elements are centered on the optical center of the surface of the lens element on which said optical elements are disposed; and/or the concentric rings of optical elements have a diameter comprised between 9.0 mm and 60 mm; and/or the optical element further comprises optical elements positioned radially between two concentric rings; and/or at least one of the optical elements is a multifocal refractive micro-lens; and/or the at least one multifocal refraction micro-lens comprises a cylindrical power; and/or the at least one multifocal refractive micro-lens comprises an aspherical surface, with or without any rotational symmetry; and/or at least one of the optical elements is a toric refractive micro-lens; and/or the at least one multifocal refractive micro-lens comprises a toric surface; and/or the optical lens is arranged to that:

over a pupil having at least a 4 mm diameter, one can measure in a plane corresponding to the at least one prescribed refractive power along at least one direction, a Modulation Transfer Function through the optical lens greater than 0.1 between 0 and 20 cyc/deg;

a majority of the light rays passing through the optical lens over said pupil pass through at least one of the plurality of optical elements, and each of the contiguous optical element verifies that $d=k/\sqrt{|P|}$, with d a characteristic dimension of the contour of said optical element in mm, $|P|$ the absolute value of a characteristic optical power of said optical element expressed in diopter, and K a number greater or equal to 0.9 and smaller than or equal to 1.7; and/or over the said pupil the optical lens produces a first optical path difference OPD1, a best spherical fitting optical lens produces a second optical path difference OPD2, a differential optical path map DOP being composed as the difference between said first optical path difference OPD1 and said second optical path difference OPD2, the differential optical path DOP being different than zero; and/or the optical elements are contiguous over said pupil when the portion of said differential optical path DOP within the range [minimum level of DOP, minimum level of DOP+10% of the amplitude] represents less than 30% of said differential optical path (DOP) over said pupil, for example at least 20%, for example at least 10%, for example at least 5%; with the amplitude the maximum level of said differential optical path (DOP) over said pupil; and/or the characteristic dimension of each optical element corresponds to the largest diameter of the inscribed circle in a contour plot defined by a level of said differential optical path (DOP), said level being constant over said pupil and within the range [minimum level of DOP, minimum level of DOP+10% of the amplitude], with the amplitude the maximum level of said differential optical path (DOP) over said pupil; and/or at least part of, for example all of, the optical elements have a characteristic optical power smaller than or equal to 20 D, for example smaller than or equal to 10 D, for example smaller than or equal to 6 D; and/or the pupil of 5 mm of diameter comprises a reference point of the optical lens, for example the fitting cross or the optical center; and/or at least 50%, for example all, of the optical elements have an optical axis and the optical axis of said optical elements intersect at a single point; and/or at least 50%, for example all, of the optical elements have at least one focal point, and the at least one focal point of each said optical elements coincide; and/or at least 50%, for example all, of the optical elements are configured to focus an image on a common position; and/or at least one, for example all, of the optical element has an optical function of not focusing an image on in standard wearing conditions; and/or at least 50%, for example at least 80%, of the light rays passing through the optical lens over said pupil pass through at least one of the plurality of optical elements; and/or at least part, for example all, of the optical elements have an annular shape, for example around a refraction area; and/or the optical elements have a contour shape being inscribable in a circle having a diameter greater than or equal to 0.2 mm, for example greater than or equal to 0.4, for example greater than or equal to 0.6, and smaller than or equal to 2.0 mm, for example smaller than 1.0 mm; and/or the optical elements are positioned along a plurality of concentric rings; and/or the optical elements are configured so that the mean focus of the light rays passing through each optical element is at a same distance to the retina, with a tolerance smaller than or equal to 2 mm, preferably smaller than or equal to 1 mm; and/or at least part, for example all, of the optical elements have a varying optical power and a power sign change between two contiguous optical elements; and/or the optical lens is fully covered by optical elements and having a Modulation Transfer Function value at 20 cy/degree, in a plane corresponding to the at least one prescribed refractive power along at least one direction, greater on the central zone than on a peripheral zone of the lens; and/or the refraction area comprises a plurality of respectively independent island-shaped areas, the refraction area is formed as the area other than the optical elements and each refraction island shape area is within one optical element; and/or at least part of the optical elements have an annular shape around a refraction area; and/or at least two optical elements are contiguous; and/or

the optical elements have a contour shape being inscribable in a circle having a diameter greater than or equal to 0.8 mm and smaller than or equal to 3.0 mm; and/or each optical element has simultaneously two different optical functions, and the optical lens is configured so that the absolute value of the difference between a measured optical power at a point, for example at a control point, of the optical lens and the optical power corresponding to the prescription for said eye of the wearer is smaller than or equal to 0.12 diopter; and/or configured so that for at least one optical element the absolute value of the difference between at least one optical power measured through said optical element of said optical lens and the optical power measured through the corresponding part of the optical lens alone is smaller than or equal to 0.25 diopter; and/or the first optical function is an optical function with a mean optical power smaller than or equal to 0.25 diopter; and/or the second optical function of at least part of the optical elements has a mean optical power greater than or equal to 0.5 diopter; and/or the second optical function of at least part of the optical elements is so as to not focus an image on the retina of the eye when the optical system is worn in standard wearing conditions, for example so as to slow down the progression of the abnormal refraction of the eye; and/or at least part, for example all, of the optical elements are diffractive lenses; and/or the diffractive lenses comprise two main diffractive orders, the first main diffractive order providing a first mean optical power smaller in absolute value than or equal to 0.25 diopter, and the second main diffractive order providing a second mean optical power greater than or equal to 0.5 diopter; and/or at least part, for example all, of the optical elements are 71-Fresnel lenses.

the diffractive lens may be a diffractive lens whose phase function $\psi(r)$ has $\pi$ phase jumps at the nominal wavelength $\lambda 0$, one may give these structures the name "$\pi$-Fresnel lenses" for clarity's sake, as opposition to unifocal Fresnel lenses whose phase jumps are multiple values of $2\pi$, $\pi$-Fresnel lens diffracts light mainly in two diffraction orders (order 0 and +1) associated to dioptric powers $P(\lambda 0)=0$ $\delta$ and a positive one, for example $P(\lambda 0)=3$ $\delta$, with $\lambda 0=550$ nm.

The disclosure further relates to a method, for example implemented by computer means, for determining an optical lens, the optical lens comprising:

a refraction area having a refractive power based on prescribed refractive power Px for said eye of the wearer and comprising at least the central zone of the optical lens, a plurality of optical elements having an optical function of not focusing an image on the retina of the eye of the wearer, for example so as to slow down the progression of the abnormal refraction of the eye, wherein the method comprises:

providing wearer data comprising at least:

prescription data indicative of the refractive power Px of the wearer and retina data indicative of the shape of the retina of the wearer, determining the arrangement of the optical elements based at least on the wearer data.

According to further embodiments which can be considered alone or in combination:

the method further comprises determining the central zone based at least on the wearer data; and/or the retina data comprise the global shape of the retina of the wearer within a reference plane and over at least 5°, for example 8° or 15°, of eccentricity; and/or the retina data comprise an indication of the shape of the retina at 0° and at least a nasal side point, for example at 5° of eccentricity and a temporal side point, for example at 5° of eccentricity; and/or the retina data comprises an indication to a predetermined model of retina shape selected based on the prescription data of the wearer; and/or the characteristic dimension of the central zone of the optical lens is determined based on the dimension of the spherical portion of the retina of the wearer; and/or the characteristic dimension of the central zone of the optical lens increases with the dimension of the spherical portion of the retina of the wearer; and/or the optical function of each optical element and/or density of the optical elements are determined based on the degree of asymmetry shape between the nasal and temporal part of the retina of the wearer; and/or the optical power of each optical element and/or density of the optical elements increases with the degree of asymmetry shape between the nasal and temporal part of the retina of the wearer; and/or the optical function of each optical element and/or density of the optical elements are determined based on the degree of prolateness of the retina of the wearer; and/or the optical power of each optical element and/or density of the optical elements decreases with the degree of prolateness of the retina of the wearer; and/or the optical function of each optical element of the optical lens is determined so as to defocus and/or not focus in standard wearing conditions at a constant distance from the temporal to nasal part of the retina of the wearer; and/or the optical function of each optical element of the optical lens is determined so as to defocus and/or not focus in standard wearing conditions at a constant distance from the temporal to nasal part of the retina of the wearer; and/or the optical function, for example the optical power, of each optical element and/or the density distribution of the optical elements is determined so as to defocus and/or not focus in standard wearing conditions at different distances from the temporal and nasal parts of the retina of the wearer, for example based at least on the degree of asymmetry shape between the nasal and temporal parts of the retina of the wearer; and/or the optical function, for example the optical power of each optical element and/or the density distribution of the optical elements is determined so as to defocus and/or not focus in standard wearing conditions at different distances from the temporal and nasal parts of the retina of the wearer, for example based at least on the degree of asymmetry shape between the nasal and temporal parts of the retina of the wearer; and/or the optical lens is divided in at least three complementary zones, the central zone and two quadrants, each quadrant comprising a plurality of optical elements, the optical function of each optical element and/or the density of optical elements in each quadrant being determined based on the global shape of the retina; and/or the optical lens is divided in at least five complementary zones, the central zone and four quadrants with an angle between two quadrant greater than 200 and smaller than 90°, each quadrant comprising a plurality of optical elements, the optical function of each optical element and/or the density of optical elements in the temporal and nasal quadrants being determined based on the global shape of the retina in a horizontal plane and the optical function of each optical element and/or the density of optical elements in the upper and lower quadrants being determined based on the global shape of the retina in a vertical plane.

According to a further aspect, the disclosure relates to a computer program product comprising one or more stored sequences of instructions that are accessible to a processor and which, when executed by the processor, causes the processor to carry out at least one of the steps of any of the methods according to the disclosure.

The disclosure further relates to a computer readable medium carrying one or more sequences of instructions of the computer program product according to the disclosure.

Furthermore, the disclosure relates to a program which makes a computer execute at least one of the steps of any of the methods of the disclosure.

The disclosure also relates to a computer-readable storage medium having a program recorded thereon; where the program makes the computer execute at least one of the steps of any of the methods of the disclosure.

The disclosure further relates to a device comprising a processor adapted to store one or more sequences of instructions and to carry out at least one of the steps of any of the methods according to the disclosure.

BRIEF DESCRIPTION OF THE DRAWINGS

Non-limiting embodiments of the disclosure will now be described with reference to the accompanying drawing wherein.

Elements in the figures are illustrated for simplicity and clarity and have not necessarily been drawn to scale. For example, the dimensions of some of the elements in the figure may be exaggerated relative to other elements to help to improve the understanding of the embodiments of the present disclosure.

DETAILED DESCRIPTION OF EMBODIMENTS OF THE DISCLOSURE

The invention relates to an optical lens element intended to be worn in front of an eye of a person.

In the reminder of the description, terms like «up», «bottom», «horizontal», «vertical», «above», «below», «front», «rear» or other words indicating relative position may be used. These terms are to be understood in the wearing conditions of the optical lens.

In the context of the present invention, the term "optical lens" can refer to an uncut optical lens or a spectacle optical lens edged to fit a specific spectacle frame or an ophthalmic lens or an intraocular lens or a contact lens, or an optical device adapted to be positioned on the ophthalmic lens. The optical device may be positioned on the front or back surface of the ophthalmic lens. The optical device may be an optical patch or film. The optical device may be adapted to be removably positioned on the ophthalmic lens for example a clip configured to be clipped on a spectacle frame comprising the ophthalmic lens.

In the sense of the disclosure, two optical elements located on a surface of the lens element are contiguous if there is a path supported by said surface that links the two optical elements and if along said path one does not reach the basis surface on which the optical elements are located.

When the surface on which the at least two optical elements are located is spherical, the basis surface corresponds to said spherical surface. In other words, two optical elements located on a spherical surface are contiguous if there is a path supported by said spherical surface and linking them and if along said path one may not reach the spherical surface.

When the surface on which the at least two optical elements are located is non-spherical, the basis surface corresponds to the local spherical surface that best fit said non-spherical surface. In other words, two optical elements located on a non-spherical surface are contiguous if there is a path supported by said non-spherical surface and linking them and if along said path one may not reach the spherical surface that best fit the non-spherical surface.

An optical lens 10 according to the disclosure is adapted to be worn by a wearer, for example in front of an eye of a wearer having at least one prescribed refractive power Px.

Figure 1:
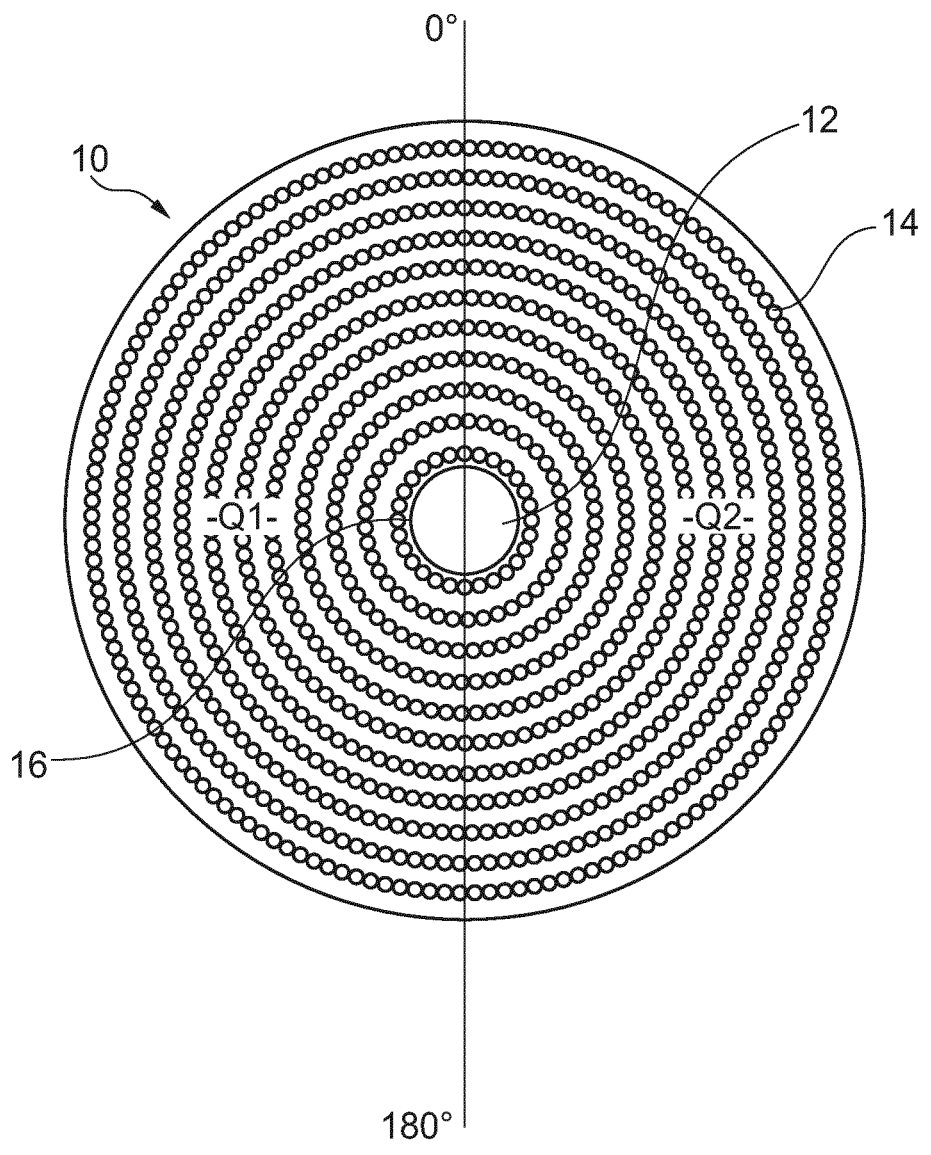
FIG. 1 is a plan view of an optical lens according to an embodiment of the disclosure.

As represented on FIG. 1, an optical lens 10 according to the invention comprises:

a refraction area 12, and a plurality of optical elements 14.

The refraction area 12 has a refractive power based on the prescribed refractive power Px for the eye of the wearer for which the lens element is adapted. The prescribed refractive is for example part of a prescription adapted for correcting the abnormal refraction of the eye of the person.

The term "prescription" is to be understood to mean a set of optical characteristics of optical power, of astigmatism, of prismatic deviation, determined by an ophthalmologist or optometrist in order to correct the vision defects of the eye, for example by means of a lens positioned in front of his eye. For example, the prescription for a myopic eye comprises the values of optical power and of astigmatism with an axis for the distance vision.

The prescription may comprise an indication that the eye of the wearer has no defect and that no refractive power is to be provided to the wearer. In such case the refractive area is configured so as to not provide any refractive power.

The refractive area is preferably formed as the area other than the areas formed of the plurality of optical elements. In other words, the refractive area is the complementary area to the areas formed of the plurality of optical elements.

As illustrated on FIG. 1, the refraction area 12 comprises at least the central zone 16 of the optical lens 10.

Preferably, the central zone 16 comprises a framing reference point that faces the pupil of the wearer gazing straight ahead in standard wearing conditions.

The wearing conditions are to be understood as the position of the lens element with relation to the eye of a wearer, for example defined by a pantoscopic angle, a Cornea to lens distance, a Pupil-cornea distance, a center of rotation of the eye (CRE) to pupil distance, a CRE to lens distance and a wrap angle.

The Cornea to lens distance is the distance along the visual axis of the eye in the primary position (usually taken to be the horizontal) between the cornea and the back surface of the lens; for example equal to 12 mm.

The Pupil-cornea distance is the distance along the visual axis of the eye between its pupil and cornea; usually equal to 2 mm.

The CRE to pupil distance is the distance along the visual axis of the eye between its center of rotation (CRE) and cornea; for example equal to 11.5 mm.

The CRE to lens distance is the distance along the visual axis of the eye in the primary position (usually taken to be the horizontal) between the CRE of the eye and the back surface of the lens, for example equal to 25.5 mm.

The pantoscopic angle is the angle in the vertical plane, at the intersection between the back surface of the lens and the visual axis of the eye in the primary position (usually taken to be the horizontal), between the normal to the back surface of the lens and the visual axis of the eye in the primary position; for example equal to –8°.

The wrap angle is the angle in the horizontal plane, at the intersection between the back surface of the lens and the visual axis of the eye in the primary position (usually taken to be the horizontal), between the normal to the back surface of the lens and the visual axis of the eye in the primary position for example equal to 0°.

An example of standard wearing condition may be defined by a pantoscopic angle of –8°, a Cornea to lens distance of 12 mm, a Pupil-cornea distance of 2 mm, a CRE to pupil distance of 11.5 mm, a CRE to lens distance of 25.5 mm and a wrap angle of 0°.

Preferably, the central zone comprises the optical center of the lens and has a characteristic dimension greater than 4 mm—corresponding to +/−8° peripheral angle on the retina side, and smaller than 22 mm corresponding to +/−44° peripheral angle on the retina side, for example smaller than 20 mm corresponding to +/−40° peripheral angle on the retina side. The characteristic dimension may be a diameter or the major minor axes of an ellipse shaped central zone.

According to an embodiment of the invention, the central zone is arranged based at least on the prescribed refractive power Px and the shape of the retina of the wearer.

For example, the characteristic dimension of the central zone of the optical lens is related to the dimension of the spherical portion of the retina of the wearer.

For example, the characteristic dimension of the central zone of the optical lens increase with the dimension of the spherical portion of the retina of the wearer.

Preferably, the shape of the retina corresponds at least to the global shape of the retina within a reference plane, for example horizontal or vertical.

In the sense of the invention, the global shape is to be understood over an eccentricity greater than or equal to 5° and smaller than or equal to 30°.

According to an embodiment of the disclosure, the shape of the retina, for example the peripheral retina, is measured with an Optical Coherence Tomography hereafter OCT, or any device that can provide axial length recordings at various eccentricities. Direct axial length assessment is preferred to peripheral refraction.

Indeed, the management of myopia progression and the follow-up of the effectiveness of myopia control solution should consider axial length change rather than Rx change as the effect induced by myopia are related to an overstretching of the retina, due to eyes that become too large. Refractive error in the periphery appears to be correlated with retina shape in the periphery but only to a certain extent. Mutti and colleagues (2019) showed that there is a significant correlation between peripheral eye length and peripheral refraction but with a correlation coefficient ($R^2$) that was only around 0.5.

OCT measurement provides another benefit to give a continuous illustration of the shape of the retina over a certain range of eccentricities. The other techniques of measurement (with the Shin Nippon for instance) provide discrete points of eye length at selected eccentricities. A continuous measurement over a large field enables not only to adapt the optical elements according to the retina shape but also to customize the central zone, for example the size of the central zone.

OCT images of the retina shape over for example 15 degrees of eccentricity enable to customize the size of the central zone to make the myopia control more efficient.

Figure 2:
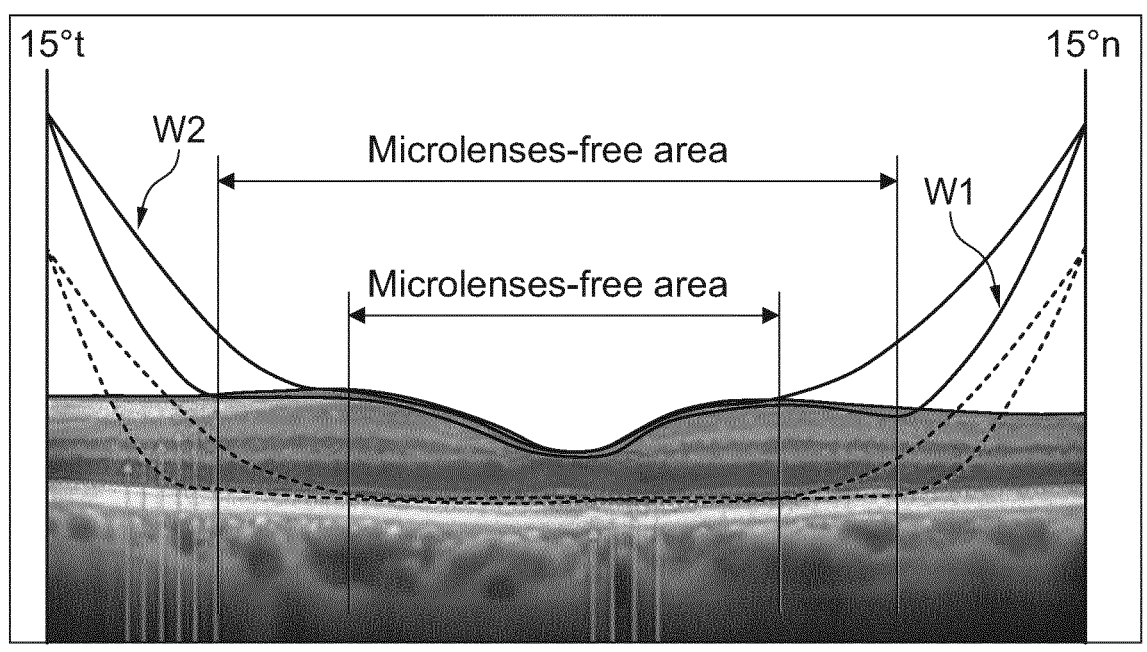
FIG. 2 illustrates the OCT measurements of the retina of different wearers.

Two wearers are compared on FIG. 2. Wearers 1 and 2, respectively W1 and W2, are myopes and have similar relative peripheral refraction and peripheral eye length at 15° but as illustrated on FIG. 2 they have different retina shape. According to peripheral Rx and punctual eye length measurement at 150 only, both wearers are considered as identical. With OCT picture, one can see that they are different and that they may need different myopia control solutions. The retina of wearer 1 remains spherical over a larger field, than wearer 2. Hence, the central zone of the optical lens should be larger for wearer 1 than for wearer 2.

The plurality of optical elements 14 having an optical function of not focusing an image on the retina of the eye of the wearer, for example so as to slow down the progression of the abnormal refraction of the eye.

According to the present disclosure, the optical elements are arranged based at least on the prescribed refractive power Px and the shape of the retina of the wearer.

According to an embodiment, the shape of the retina may be obtained from a measurement of choroid on the whole or a part of retina, or from OCT measurement, or from peripheral refraction, or from measurement to get a segmentation of the shape of the retina, or from theoretical model of the shape of the retina.

Examples theoretical model of the shape of the retina are disclosed in "Off-axis aberrations of a wide-angle schematic eye model" Navarro 1999 and in "Optical models for human myopic eyes" Atchison 2006.

According to an embodiment, the optical elements may be arranged based at least on the prescribed refractive power Px and a predetermined model of retina shape selected based on the prescribed refractive power Px of the wearer.

The predetermined model of retina shape can be compared to the actual measured retina shape of the wearer.

The optical elements may be configured so that at least along one section of the lens the mean sphere of the optical elements increases from a point of said section towards the peripheral of said section.

According to an embodiment of the disclosure the optical elements may be configured so that at least along one section of the lens, for example at least the same section as the one along which the mean sphere of the optical elements increases, the mean cylinder increases from a point of said section, for example the same point as for the mean sphere, towards the peripheral part of said section.

As is known, a minimum curvature $CURV_{min}$ is defined at any point on an aspherical surface by the formula:

$$CURV_{min} = \frac{1}{R_{max}}$$

where $R_{max}$ is the local maximum radius of curvature, expressed in meters and $CURV_{min}$ is expressed in dioptres.

Similarly, a maximum curvature $CURV_{max}$ can be defined at any point on an aspheric surface by the formula:

$$CURV_{max} = \frac{1}{R_{min}}$$

where $R_{min}$ is the local minimum radius of curvature, expressed in meters and $CURV_{max}$ is expressed in dioptres.

It can be noticed that when the surface is locally spherical, the local minimum radius of curvature $R_{min}$ and the local maximum radius of curvature $R_{max}$ are the same and, accordingly, the minimum and maximum curvatures $CURV_{min}$ and $CURV_{max}$ are also identical. When the surface is aspherical, the local minimum radius of curvature $R_{min}$ and the local maximum radius of curvature $R_{max}$ are different.

From these expressions of the minimum and maximum curvatures $CURV_{min}$ and $CURV_{max}$, the minimum and maximum spheres labeled $SPH_{min}$ and $SPH_{max}$ can be deduced according to the kind of surface considered.

When the surface considered is the object side surface (also referred to as the front surface), the expressions are the following:

$$SPH_{min} = (n-1)*CURV_{min} = \frac{n-1}{R_{max}},$$

$$\text{and } SPH_{min} = (n-1)*CURV_{min} = \frac{1-n}{R_{max}}$$

where n is the index of the constituent material of the lens.

If the surface considered is an eyeball side surface (also referred to as the back surface), the expressions are the following:

$$SPH_{min} =$$

$$(1-n)*CURV_{min} = \frac{1-n}{R_{max}} \text{ and } SPH_{max} = (1-n)*CURV_{max} = \frac{1-n}{R_{min}}$$

where n is the index of the constituent material of the lens.

As is well known, a mean sphere $SPH_{mean}$ at any point on an aspherical surface can also be defined by the formula:

$$SPH_{mean} = \frac{1}{2}(SPH_{min} + SPH_{max})$$

The expression of the mean sphere therefore depends on the surface considered:

if the surface is the object side surface,

14

$$SPH_{mean} = \frac{n-1}{2}\left(\frac{1}{R_{min}} + \frac{1}{R_{max}}\right)$$

if the surface is an eyeball side surface, $$SPH_{mean} = \frac{1-n}{2}\left(\frac{1}{R_{min}} + \frac{1}{R_{max}}\right)$$

a cylinder CYL is also defined by the formula $CYL=|SPH_{max}-SPH_{min}|$.

The characteristics of any aspherical face of the lens may be expressed by the local mean spheres and cylinders. A surface can be considered as locally aspherical when the cylinder is at least 0.25 diopters.

Figure 7A:
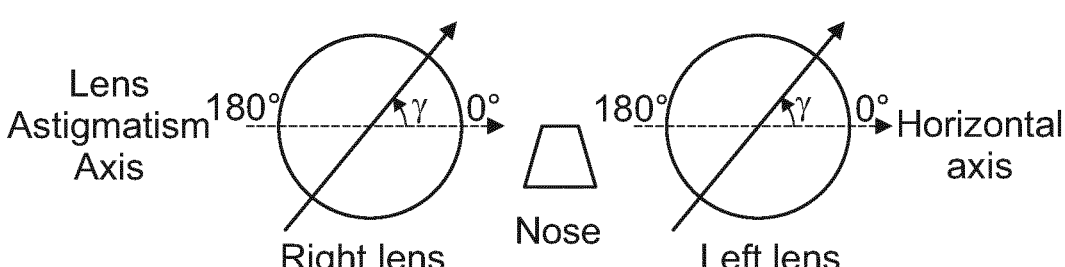
FIG. 7*a* illustrates the astigmatism axis γ of a lens in the TABO convention.
Figure 7B:
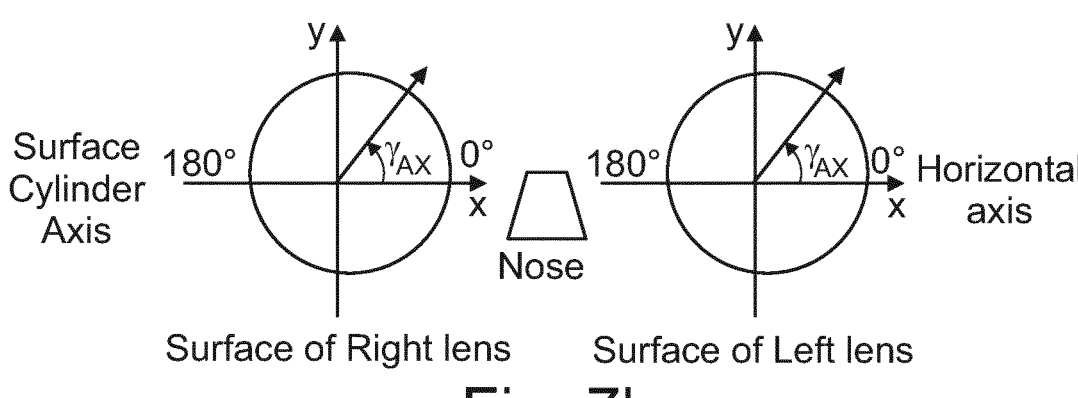
FIG. 7*b* illustrates the cylinder axis $\gamma_{AX}$ in a convention used to characterize an aspherical surface.

For an aspherical surface, a local cylinder axis $\gamma_{AX}$ may further be defined. FIG. 7a illustrates the astigmatism axis $\gamma$ as defined in the TABO convention and FIG. 7b illustrates the cylinder axis $\gamma_{AX}$ in a convention defined to characterize an aspherical surface.

The cylinder axis $\gamma_{AX}$ is the angle of the orientation of the maximum curvature $CURV_{max}$ with relation to a reference axis and in the chosen sense of rotation. In the above defined convention, the reference axis is horizontal (the angle of this reference axis is 0°) and the sense of rotation is counterclockwise for each eye, when looking at the wearer ($0°\leq\gamma AX\leq180°$). An axis value for the cylinder axis $\gamma_{AX}$ of +45° therefore represents an axis oriented obliquely, which when looking at the wearer, extends from the quadrant located up on the right to the quadrant located down on the left.

The optical lens 10 according to the disclosure comprises an object side surface, typically formed as a convex curved surface toward an object side, and an eye side surface, typically formed as a concave surface having a different curvature than the curvature of the object side surface.

According to an embodiment of the disclosure, at least part, for example all, of the optical elements are located on the front surface of the optical lens.

At least part, for example all, of the optical elements may be located on the back surface of the optical lens.

At least part, for example all, of the optical elements may be located between the front and back surfaces of the optical lens. For example, the lens element may comprise zones of different refractive index forming the optical elements.

According to a preferred embodiment of the disclosure, every circular zone having a radius comprised between 2 and 4 mm comprising a geometrical center located at a distance of the optical center of the optical lens greater or equal to +5 mm, the ratio between the sum of areas of the parts of optical elements located inside said circular zone and the area of said circular zone is comprised between 20% and 70%, preferably between 30% and 60%, and more preferably between 40% and 50%.

According to an embodiment of the invention, at least one, for example all, of the optical elements is a micro-lens.

In the sense of the invention, a "micro-lens" has a contour shape being inscribable in a circle having a diameter greater than or equal to 0.8 mm and smaller than or equal to 3.0 mm, preferably greater than or equal to 1.0 mm and smaller than 2.0 mm.

When the micro-lenses are disposed on the front face of the optical lens, the front face of the micro-lenses may be designed according to the prescription and the shape of the retina and the rear face of the micro-lenses may be designed according to the prescription of the wearer.

Alternatively, when the micro-lenses are on the rear face of the optical lens, the rear face of the micro-lenses may be designed according to the prescription and the shape of the retina and the front face of the micro-lenses may be designed according to the prescription of the wearer.

When the micro-lenses are encapsulated between the front face and the rear face of the optical lens, the rear and the front faces of the micro-lenses may be designed according to the prescription and the shape of the retina.

The optical elements may be configured so that along at least one section of the lens the mean sphere and/or the mean cylinder of optical elements increases from the center of said section towards the peripheral part of said section.

According to an embodiment of the disclosure, the optical elements are configured to defocus in standard wearing conditions at a constant distance from the temporal to nasal part of the retina of the wearer.

In the sense of the invention defocus means a focus in front or the retina, so not on the retina, with spherical optical elements.

Alternatively, the optical elements may be configured to not focus in standard wearing conditions at a constant distance from the temporal to nasal part of the retina of the wearer. In the sense of the invention the optical elements are considered as configured to not focus when configured to provide a volume of none focused light, for example using aspherical optical elements.

According to an embodiment of the disclosure, the optical function of each optical element and/or density of the optical elements are adapted to the degree of asymmetry shape between the nasal and temporal part of the retina of the wearer.

For example, the optical power of each optical element and/or density of the optical elements increases with the degree of asymmetry shape between the nasal and temporal part of the retina of the wearer.

In the examples of FIG. 2, the retina curvature of both wearers is steeper in the nasal than in the temporal region. The configuration of the optical elements takes this asymmetry into account by providing optical elements with greater power in the temporal field than in the nasal field of the optical lens. This approach enables the myopic defocus to follow the asymmetric shape of the retina.

In addition to adapting the central zone, the measurements of the peripheral shape of the retina can be used to adapt the evolution of the optical power of the optical elements with eccentricity.

Figure 3:
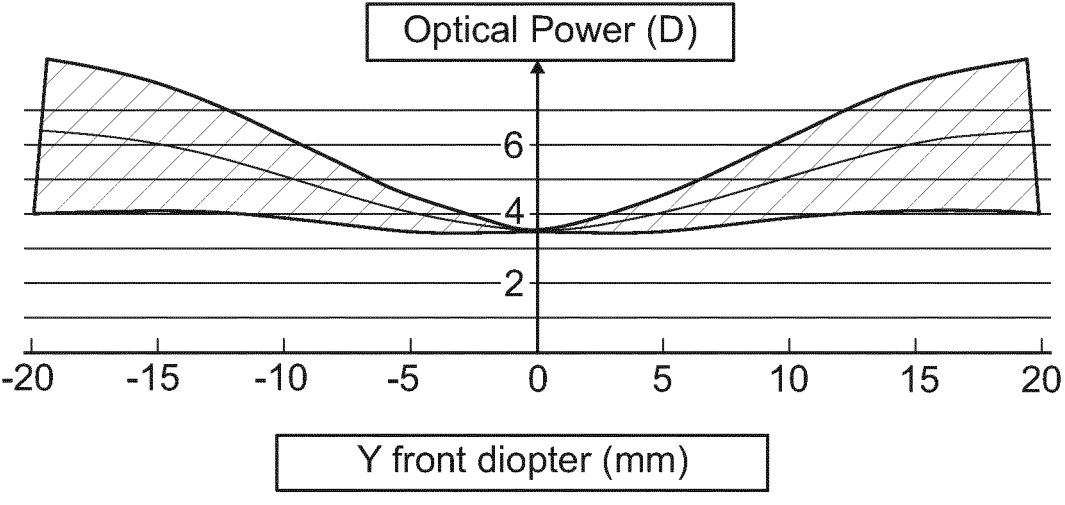
FIG. 3 illustrates the mean and extremes of power variation profiles according to the eccentricity of the optical lens.

FIG. 3 shows the mean and both extremes curves of power variation profiles according to eccentricity on the optical lens. Highlighted area between both extreme curves represents the individual variability of profiles according to variability in retina shape.

Figure 4:
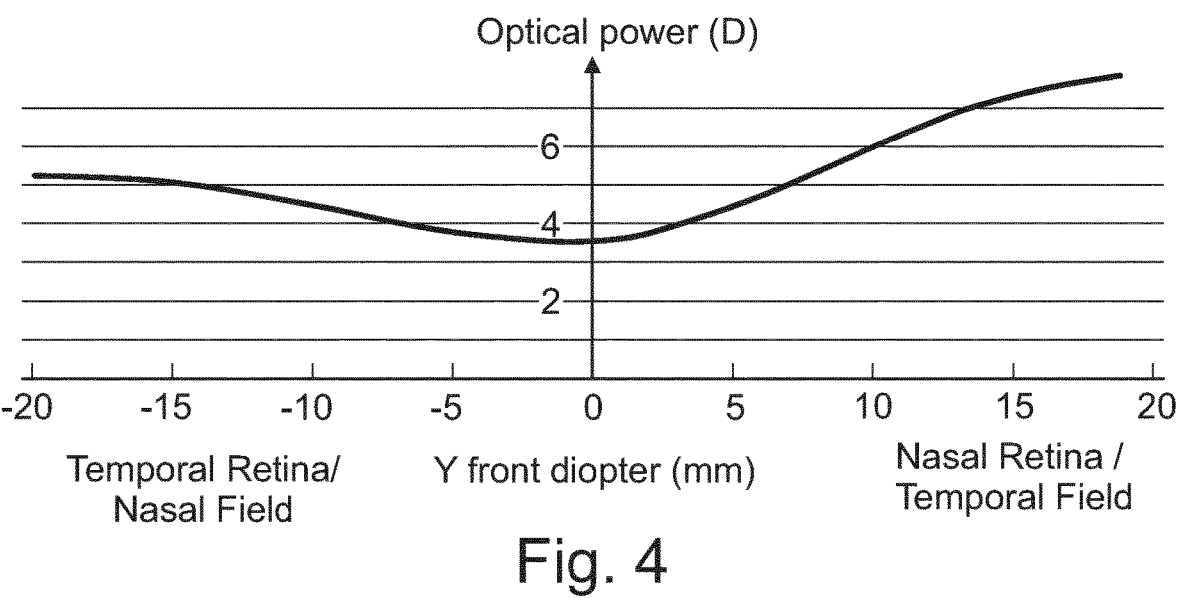
FIG. 4 illustrates an example of optical power profile according to the disclosure.

FIG. 4 shows an example of a myopic wearer having a steeper (than the average) nasal retina which requires to increase optical element power in the temporal field. Adaptation of optical element pattern to the individual shape of the peripheral retina can also be done by varying the density of optical elements.

Alternatively, instead of using retina shape measurement to create the defocus or volume of defocus at a constant distance of the retina, one may determine the defocus values for having a constant distance, and then add to it a gradient on optical element optical powers or optical element densities to increase the defocus distance more in front of the retina for more peripheral optical elements.

The degree of prolateness of the retina of the wearer may further be considered when configuring the optical elements. Therefore, according to the disclosure, the optical function of each optical element and/or density of the optical elements are adapted to the degree of prolateness of the retina of the wearer.

The prolateness of the eye may be characterized by determining the shape of the retina of the eye of the person at least over a given angular zone of the retina of the person. The given angular zone is of at least 5° on the nasal part, for example at least 100 on the nasal part, preferably at least 15° on the nasal part, and of at least 5° on the temporal part, for example at least 100 on the temporal part, preferably at least 15° on the temporal part.

Mathematically, the prolateness can be for example quantified by fitting the posterior eye shape data by a quadratic function.

The quadratic function may be for example, $f(x)=-a*(x+b)^2+c$ where "x" is visual field angle, "a" quantifies the prolateness, "b" factor specifies the x position (i.e., retinal position) of the peak of the function, and "c" is the y position (i.e. best fitting central axial length).

For example, a specific procedure for obtaining the prolateness is to find such a, b, and c parameters to minimize the sum of squared residual, i.e., the difference between an observed value, and the fitted value provided by the quadratic function, commonly referred to as least squares analysis, over a number of iterations, for example 1000. The best fitting a, b, and c parameters, i.e., the sum of least squared residuals across the iterations is the smallest, are considered best representatives of the retinal shape and the term "a" is taken as an indicator of the prolateness of the eye.

According to an embodiment of the disclosure, the prolateness indicator is determined by fitting a two-dimensional cross-section of the retina of the eye of the person with a third-degree polynomial function.

For example, the prolateness indicator is determined using the first derivative of the best fitting third polynomial function $(f(x)=ax^3-bx^2+cx+d)$ to the retinal data.

Specifically, one can minimize the sum of squared residuals, i.e., the difference between an observed value, and the fitted value provided by the third polynomial function, over a number of iterations by varying the parameters "a", "b", "c", and "d".

The best fit is then subjected to the first derivative and the mean, for example the absolute value to account for opposite signs on the sides of the fovea, of the first derivative provides an indication of the prolateness.

An advantage of this approach is that the asymmetrical third-degree polynomial function usually provides a better fit to the retinal data compared to a strictly symmetrical function.

Secondly this approach allows choosing only a certain region of the retina over which the mean of the derivative is calculated, i.e., prolateness. In its most localized version, it allows to quantify retinal steepness at one particular point. Another way to quantify the retinal steepness at a given point is to find the tangent of the polynomial function at that point and determine its angle.

Furthermore, this approach allows quantifying the retinal asymmetry, i.e. the difference between the prolateness/steepness of nasal and temporal retina.

According to an embodiment of the disclosure, the prolateness indicator may be determined based on a 3D measurement of the retina of said at least one eye of the person.

The ocular shape data can be acquired at different locations or orientations across the retina for example by denser sampling or using an advanced imaging modality such as optical coherence tomography or OCT or MRI system. In case of such continuous retinal shape data, the retinal shape parameters can be calculated by the methods described previously. Furthermore, imaging techniques such as optical coherence tomography allow for volume data acquisition that allow for calculation of retinal prolateness maps.

A similar approach to mapping prolateness, can be used for choroidal thickness, i.e. mapping choroidal thickness changes in a volume.

For example, it is advantageous that the optical power of each optical element and/or density of the optical elements decreases with the degree of prolateness of the retina of the wearer.

According to an embodiment of the invention, the optical function, for example the optical power, of each optical element and/or the density distribution of the optical elements is adapted so as to defocus and/or not focus in standard wearing conditions at different distances from the temporal and nasal parts of the retina of the wearer, for example based at least on the degree of asymmetry shape between the nasal and temporal parts of the retina of the wearer.

For example, considering speed is bigger on the retina where the hyperopic defocus is bigger on can configure the optical elements to create a signal that helps to "reshape" the retina closer to an emmetrope retina shape, i.e. reducing asymmetry between nasal and temporal.

According to an embodiment, the optical elements may be configured to create a signal at a greater distance in front of the nasal retina compared to its distance in front of the temporal retina (or inverse), if hyperopic defocus is more important on nasal retina than on temporal retina (or inverse).

The optical elements may be configured to create a signal only in front of the retina where the defocus is bigger. This may be a temporary solution to "rebalance" the asymmetry between nasal and temporal retina to slow down the retina progression and after this rebalancing the wearer may be provided with more balanced optical elements.

The optical elements may be configured to create a signal in front of the retina where the hyperopic defocus is bigger, and a signal behind the retina where the hyperopic defocus is lower. Advantageously, such solution would be faster in "rebalancing" the asymmetry between nasal and temporal. After this rebalancing, the wearer may be provided with more balanced optical elements.

Another more simplistic alternative is to take into account the nasal and temporal asymmetry in retina shape by doing an increased distance of defocus in front of the retina with its periphery, for the nasal and temporal side as well.

Advantageously, having a greater defocus or density of optical elements in periphery affects the image quality only in periphery where image quality is not very important, and the increased defocus is interesting for myopia control.

According to an embodiment of the disclosure, the optical elements may be aspherical microlenses that create a volume of defocus, which is the caustics that is created in front of the retina in peripheral vision, defined by the min and the max value of aspherical power of the microlenses that correspond respectively to a min and a max value of distance of defocus in front of the retina. For example, an aspherical microlens where the max value is at its center, and the min value at its edge.

Therefore, instead of having only one microlens power varying between nasal and temporal retina, a volume of defocus is defined varying between nasal and temporal retina. For example, if nasal hyperopic defocus is bigger, the microlenses may be configured to create a volume of defocus bigger in nasal retina (for example 5 dp of aspherization in nasal) than in temporal retina (for example 2 dp of aspherization in temporal), both with a constant min value for the volume position.

Alternatively, the microlenses may be configured to define a constant volume of defocus (for example 3.5 dp of aspherization) with a bigger min value in nasal retina (for example 4 dp in front of retina) than in temporal retina (for example 2 dp in front of retina), or a mix.

As illustrated on FIG. 1, the optical lens may be divided in at least three complementary zones, the central zone 16 and two quadrants Q1 and Q2. Each quadrant comprising a plurality of optical elements, the optical function of each optical element and/or the density of optical elements in each quadrant being adapted to the global shape of the retina.

The shape of the retina of the wearer may be provided in at least two planes, for example a horizontal plane and a vertical plane. The optical elements and the central zone may be adapted to the retina shape in both horizontal and vertical planes.

Figure 5:
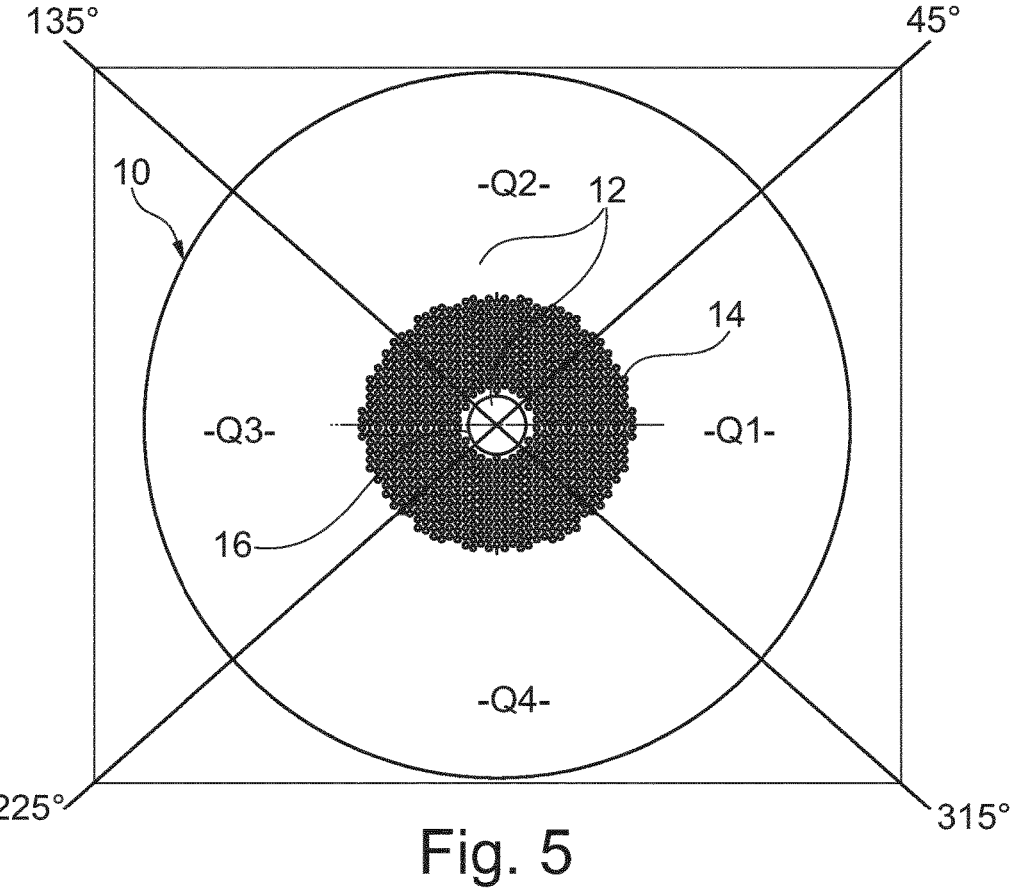
FIG. 5 is a plan view of an optical lens according to an embodiment of the disclosure.

FIG. 5 provides an example of such optical lens.

The optical lens may be divided in five complementary zones, a central zone 16 having a power being equal to the refractive power corresponding to the prescription of the wearer and four quadrants Q1, Q2, Q3, Q4.

The angle between two quadrants is preferably greater than or equal to 200 and smaller than or equal to 90°.

Preferably the four quadrants are at 45°. In the sense of the invention the "quadrants at 45°" are to be understood as equal angular quadrant of 90° oriented in the directions 45°/225° and 135°/315° according to the TABO convention as illustrated on FIG. 5.

Each quadrant comprising a plurality of optical elements, the optical function of each optical element and/or the density of optical elements in the temporal and nasal quadrants Q1, Q3 is adapted to the global shape of the retina in a horizontal plane.

The optical function of each optical element and/or the density of optical elements in the upper and lower quadrants Q2, Q4 is adapted to the global shape of the retina in a vertical plane.

The disclosure further relates to a segmented approach taking into account statistical nasal/temporal asymmetries in order to provide better myopia control solutions. Recent observations show that the steeper the temporal retina, the faster eye length elongation after use of myopia control solution.

This relation between myopia progression and nasal-temporal asymmetry is confirmed by refractive error change rate.

In addition, the same recent observations show that the wearers with relatively steeper temporal retina, that tend to progress faster, are more responsive to myopia control solution and that the results are greatly dependent on the configuration of the myopia control solution.

The opposite is also true, wearer with relatively steeper nasal retina, that overall progress slower, also show a smaller responsive to myopia control solution and the result are less affected by the configuration of the myopia control solution.

All in all, the most aggressive myopia control solution should be given to wearers with relatively temporal steeper retinal because they are expected to progress fast and are most susceptible to variations in myopia control solution.

For wearer with nasal steeper who progress the least but still show some responsiveness to treatment variation, other factors may be taken into account.

Recent observations show that the retinal steepness is associated with an average astigmatism J180 in the corresponding retinal region (positively for the temporal retina, negatively for the nasal retina.

The average astigmatisms J180 are calculated in the temporal and nasal region as J180N=(J180N15+J180N30)/2 for the nasal retina and J180T=(J180T15+J180T30)/2 for the temporal retina where T and N denote temporal and nasal, respectively and 15 and 30 denote retinal eccentricity.

Therefore, the optical elements and/or the central zone of the optical lens according to the disclosure may be arranged based on a J180 measurement that is easier and more common than a full retina shape measurement.

The present disclosure further relates to a method, for example implemented by computer means for determining an optical lens according to the disclosure.

Figure 6:
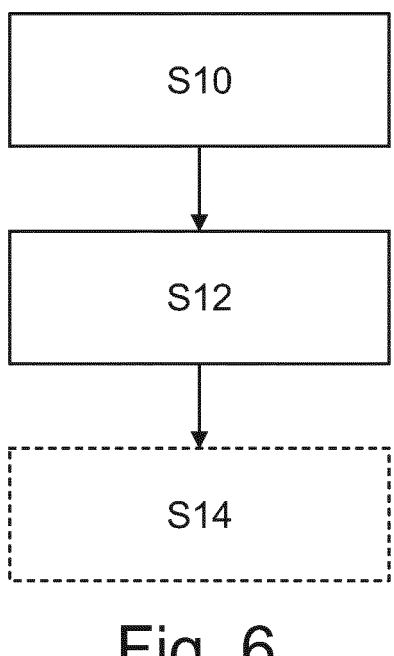
FIG. 6 is a flowchart of different steps of a method for according to the disclosure.

As illustrated on FIG. 6, a method according to the disclosure comprises at least:

providing wearer data S10, determining the arrangement of the optical elements S12.

The providing wearer data provided at step S10 comprise at least.

prescription data, and retina data.

As described in relation to the optical lens according to the disclosure, the prescription data relate at least to the refractive power Px of the wearer that is to wearer the optical lens determined by the method. More generally the prescription data may comprise all the information general included in the optical prescription.

The retina data are indicative of the shape of the retina of the wearer.

As described in greater detail with reference to the optical lens according to the disclosure, the retina data may comprise the global shape of the retina of the wearer within a reference plane and over at least 5° of eccentricity, for example at least 8° of eccentricity, or even at least 15° of eccentricity.

The retina data may comprise an indication of the shape of the retina at 0° and at least a nasal side point, for example at 5° or 15° of eccentricity and a temporal side point, for example at 5° or 15° of eccentricity.

The retina data may further comprise an indication to a predetermined model of retina shape selected based on the prescription data of the wearer.

The relationship between a wearers' refraction (spherical equivalent) can be derived from a certain population data. It can for example described using the Gompertz function:

$$p(r) = ae^{-e^{b-cr}}$$

where p is the prolateness in mm/deg$^2$; r is spherical equivalent in diopter; a is an asymptote in mm/deg$^2$; b sets the displacement along the x-axis in diopter; c sets the growth rate, and e is Euler's number. The a, b, c, parameters can vary across populations, ethnicities, genders, etc. For illustration, the parameter values from a particular population can be for example a=2.1×10$^{-3}$, b=−0.84, c=0.38.

The method of the disclosure may further comprise in addition determining the arrangement of the optical elements S12 a step S14 of determining the central zone based at least on the wearer data.

According to an embodiment of the disclosure, and as disclosed in greater detail with reference to the optical lens, the characteristic dimension of the central zone of the optical lens to be determined, is determined based on the dimension of the spherical portion of the retina of the wearer.

According to an embodiment of the disclosure, and as disclosed in greater detail with reference to the optical lens, the optical function of each optical element and/or density of the optical elements may be determined based on the degree of asymmetry shape between the nasal and temporal part of the retina of the wearer.

For example, the optical power of each optical element and/or density of the optical elements increases with the degree of asymmetry shape between the nasal and temporal part of the retina of the wearer.

According to an embodiment of the disclosure, and as disclosed in greater detail with reference to the optical lens, the optical function of each optical element and/or density of the optical elements may be determined based on the degree of prolateness of the retina of the wearer.

For example, the optical power of each optical element and/or density of the optical elements decreases with the degree of prolateness of the retina of the wearer.

According to an embodiment of the disclosure, and as disclosed in greater detail with reference to the optical lens, the optical function of each optical element of the optical lens may be determined so as to defocus and/or not focus in standard wearing conditions at a constant distance from the temporal to nasal part of the retina of the wearer.

According to an alternative embodiment of the disclosure, and as disclosed in greater detail with reference to the optical lens the optical function, for example the optical power, of each optical element and/or the density distribution of the optical elements may be determined so as to defocus and/or not focus in standard wearing conditions at different distances from the temporal and nasal parts of the retina of the wearer, for example based at least on the degree of asymmetry shape between the nasal and temporal parts of the retina of the wearer.

According to an embodiment of the disclosure, and as disclosed in greater detail with reference to the optical lens, the optical lens may be divided in at least three complementary zones, the central zone and two quadrants, each quadrant comprising a plurality of optical elements. During step S12, the optical function of each optical element and/or the density of optical elements in each quadrant may be determined based on the global shape of the retina.

According to an embodiment of the disclosure, and as disclosed in greater detail with reference to the optical lens, the optical lens is divided in at least five complementary zones, the central zone and four quadrants with an angle between two quadrants greater than 200 and smaller than 90°, each quadrant comprising a plurality of optical elements.

During step S12, the optical function of each optical element and/or the density of optical elements in the temporal and nasal quadrants may be determined based on the global shape of the retina in a horizontal plane and the optical function of each optical element and/or the density of optical elements in the upper and lower quadrants may be determined based on the global shape of the retina in a vertical plane.

The method according to the invention may further comprise a manufacturing step during which the optical lens determined is manufactured.

The manufacturing may comprise surfacing one or both surfaces of the optical lens, additive manufacturing, molding or any know manufacturing method and any combination of said manufacturing methods.

The disclosure has been described above with the aid of embodiments without limitation of the general inventive concept.

Many further modifications and variations will be apparent to those skilled in the art upon making reference to the foregoing illustrative embodiments, which are given by way of example only and which are not intended to limit the scope of the disclosure, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the disclosure.

The invention claimed is:

1. An optical lens intended to be worn in front of an eye of a wearer having at least one prescribed refractive power Px, the optical lens comprising:
   a refraction area having a refractive power based on the prescribed refractive power Px for the eye of the wearer and comprising at least the central zone of the optical lens; and
   a plurality of optical elements having an optical function of not focusing an image on a retina of the eye of the wearer,
   wherein the optical elements are arranged based at least on the prescribed refractive power Px and a shape of the retina of the wearer,
   wherein the optical function of each optical element and/or density of the optical elements are adapted to a degree of asymmetry shape between a nasal and temporal part of the retina of the wearer.

2. The optical lens according to claim 1, wherein the central zone is arranged based at least on the prescribed refractive power Px and the shape of the retina of the wearer.

3. The optical lens according to claim 1, wherein the central zone comprises the optical center of the lens and has a characteristic dimension greater than 4 mm and smaller than 20 mm.

4. The optical lens according to claim 1, wherein a characteristic dimension of the central zone of the optical lens is related to the dimension of a spherical portion of the retina of the wearer.

5. The optical lens according to claim 1, wherein the shape of the retina corresponds at least to the global shape of the retina within a reference plane that is horizontal or vertical.

6. The optical lens according to claim 1, wherein the shape of the retina of the wearer is a predetermined model of retina shape selected based on the prescribed refractive power Px of the wearer.

7. The optical lens according to claim 1, wherein the optical power of each optical element and/or density of the optical elements increases with a degree of asymmetry shape between the nasal and temporal part of the retina of the wearer.

8. The optical lens according to claim 1, wherein the optical function of each optical element and/or density of the optical elements are adapted to the degree of prolateness of the retina of the wearer.

9. The optical lens according to claim 1, wherein the optical function of each optical element of the optical lens is adapted so as to defocus and/or not focus in standard wearing conditions at a constant distance from the temporal to nasal part of the retina of the wearer.

10. The optical lens according to claim 1, wherein the optical function of each optical element and/or the density distribution of the optical elements is adapted so as to defocus and/or not focus in standard wearing conditions at different distances from the temporal and nasal parts of the retina of the wearer.

11. A method implemented by a computer device for determining an optical lens, the optical lens including:
   a refraction area having a refractive power based on prescribed refractive power Px for an eye of a wearer and comprising at least the central zone of the optical lens, and
   a plurality of optical elements having an optical function of not focusing an image on a retina of the eye of the wearer,
   the method comprising:
   providing wearer data comprising at least:
   prescription data indicative of the refractive power Px of the wearer, and retina data indicative of a shape of the retina of the wearer; and determining an arrangement of the optical elements based at least on the wearer data,
   wherein the optical function of each optical element and/or density of the optical elements are adapted to a degree of asymmetry shape between a nasal and temporal part of the retina of the wearer.

12. The method according to claim 11, further comprising determining the central zone based at least on the wearer data.

13. The method according to claim 11, wherein the retina data comprise the global shape of the retina of the wearer within a reference plane and over at least 5° of eccentricity.

14. The method according to claim 11, wherein the retina data comprises an indication from a predetermined model of retina shape selected based on the prescription data of the wearer.

15. A method implemented by a computer device for determining an optical lens, the optical lens including:
   a refraction area having a refractive power based on prescribed refractive power Px for an eye of a wearer and comprising at least the central zone of the optical lens, and
   a plurality of optical elements having an optical function of not focusing an image on a retina of the eye of the wearer,
   the method comprising:
   providing wearer data comprising at least:
   prescription data indicative of the refractive power Px of the wearer, and retina data indicative of a shape of the retina of the wearer; and determining an arrangement of the optical elements based at least on the wearer data,
   wherein the retina data comprise the global shape of the retina of the wearer within a reference plane and over at least 5° of eccentricity.

* * * * *